Aug. 17, 1954  J. A. MacLEAN, JR  2,686,546
SELF-LOCKING NUT AND PROCESS OF MANUFACTURING SAME
Filed June 19, 1947  3 Sheets-Sheet 1

INVENTOR.
John A. MacLean, Jr.
BY
Albert G. McCaleb
Atty.

Aug. 17, 1954          J. A. MacLEAN, JR          2,686,546
SELF-LOCKING NUT AND PROCESS OF MANUFACTURING SAME
Filed June 19, 1947                       3 Sheets-Sheet 2

INVENTOR.
John A. MacLean, Jr.
BY
Albert G. McCaleb
Atty.

Aug. 17, 1954     J. A. MacLEAN, JR     2,686,546
SELF-LOCKING NUT AND PROCESS OF MANUFACTURING SAME
Filed June 19, 1947                      3 Sheets-Sheet 3
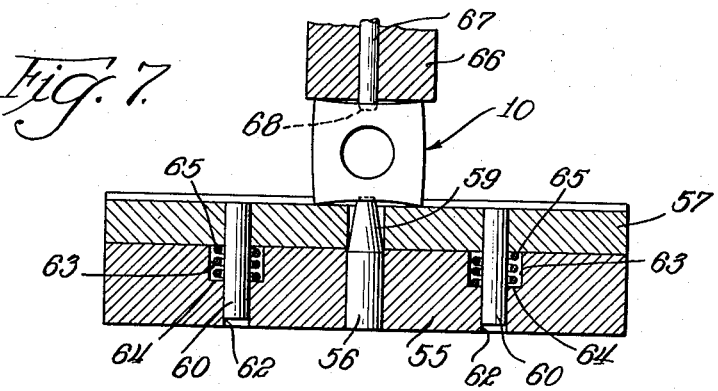
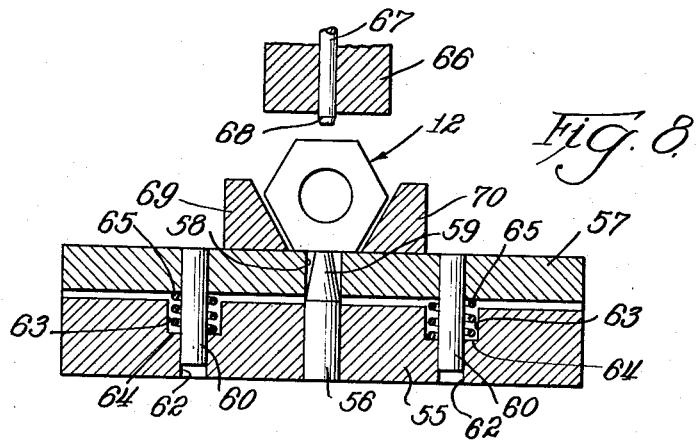
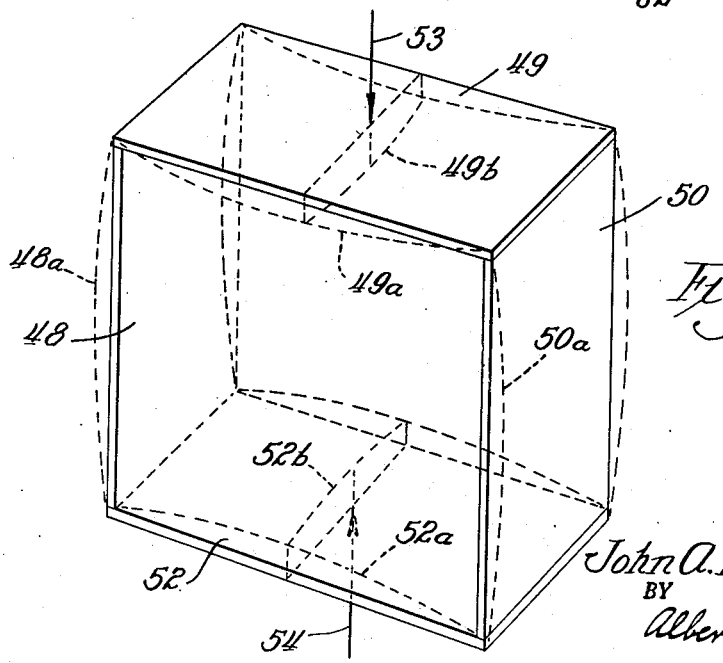
INVENTOR.
John A. MacLean, Jr.
BY
Albert G. McCaleb
Atty.

Patented Aug. 17, 1954

2,686,546

UNITED STATES PATENT OFFICE 2,686,546

SELF-LOCKING NUT AND PROCESS OF MANUFACTURING SAME

John A. MacLean, Jr., Winnetka, Ill., assignor to MacLean-Fogg Lock Nut Company, Chicago, Ill., a corporation of Illinois Application June 19, 1947, Serial No. 755,556

2 Claims. (Cl. 151—21)

This invention relates to self-locking nuts and a process by which such nuts may be produced commercially.

One of the more general objects of the invention is to provide a self-locking nut, the application of which nut to a bolt of the proper size may be started from either end of the nut with relative ease.

Another object of the invention is to provide a self-locking nut produced by distorting a standard nut beyond its elastic limit in such a manner that it will bind tightly on an associated bolt of the proper size to provide an effective frictional locking action with the bolt, and, in effecting such locking action, will not be permanently deformed by the bolt so as to prevent substantially similar locking action upon reuse on the same or similar bolts for a plurality of times.

A further object of this invention is to provide a self-locking nut embodying locking portions produced by deformation of the normal nut body in a manner to form surfaces smoothly curved in transversely disposed planes, so that the locking action of the nut is smooth, gradual and conducive to the utilization of the normal elastic characteristics of the nut body metal.

As another object, the invention has within its purview the provision of a self-locking nut in which the extent of deformation for producing the locking effect is determined by factors including the elastic characteristics of the nut material.

This invention also comprehends the provision of a process of manufacturing self-locking nuts and by which nuts capable of reuse several times without loss of their locking action may be made with consistency in quantities.

It is a further object of the invention to provide a method of effectively deforming nuts in both axial and lateral planes by one operation and in a manner such that desirable self-locking action and characteristics are produced.

Another object of the present invention is to provide a method of manufacturing self-locking nuts, and for the accomplishment of which method tools are relatively simple and inexpensive, as well as being subject to long and consistent service.

Other objects and advantages of the invention will be apparent from the following description and the accompanying drawings in which similar characters of reference indicate similar parts throughout the several views.

Figs. 7 and 8 are similar front views illustrating a preferred type of die for producing the self-locking nuts of my invention by my preferred method, in which views certain of the die parts are shown in section in both closed and open positions and as applied to nuts of different shapes; and Fig. 9 is a diagrammatic view for illustrative purposes which provides an indication of the deformations embodied in the self-locking nut of my invention and produced by my preferred process and tools.

Although the self-locking nut structure of this invention and my presently disclosed method of producing such self-locking nuts are applicable to various sizes and polygonal shapes of nuts, they are disclosed herein for illustrative purposes as applied to nuts of square and hexagonal shapes. Inasmuch as both the square and hexagonal nuts embody opposed pairs of substantially plane side surfaces in angularly disposed relationship, the resultant self-locking structure and the manner of producing that structure, in both instances, are similar.

Figure 1:
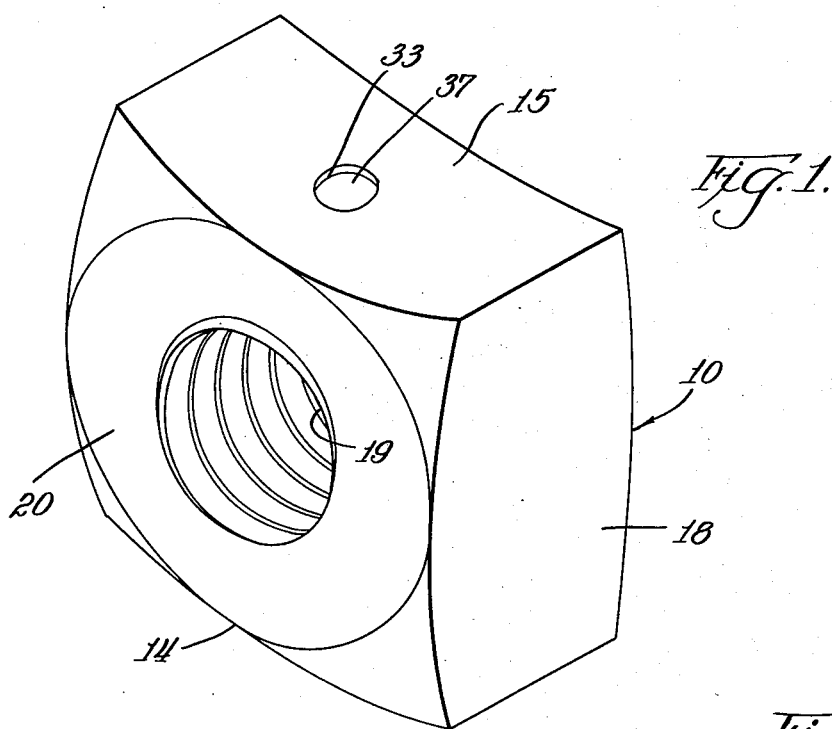
Fig. 1 is a perspective view of a square self-locking nut which embodies a preferred adaptation of my invention and which is suited to manufacture by my preferred method.
Figures 2, 3:
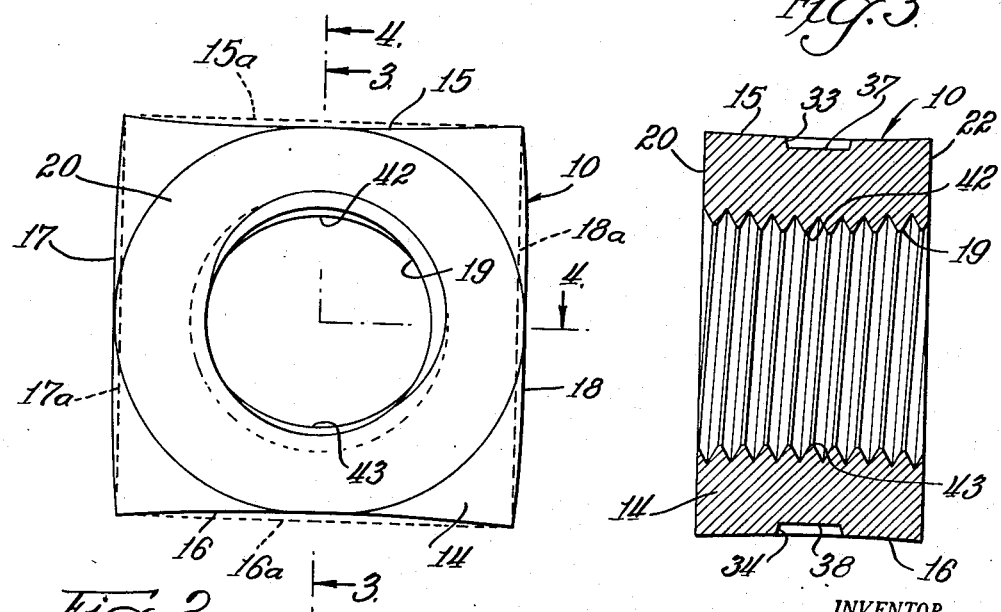
Fig. 2 is an end elevational view of the nut shown in Fig. 1.
Fig. 3 is a side sectional view of the self-locking nut wherein the section is taken substantially on a line 3—3 of Fig. 2, and viewed as indicated by the accompanying arrows.
Figure 4:
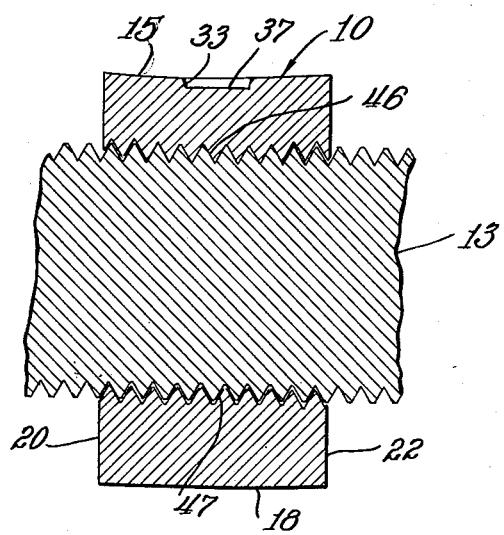
Fig. 4 is a quarter sectional view with both portions shown in plan, with the section taken substantially as indicated by lines 4—4 in Fig. 2, and wherein the application of the nut to a threaded element, such as a bolt, is depicted.
Figure 5:
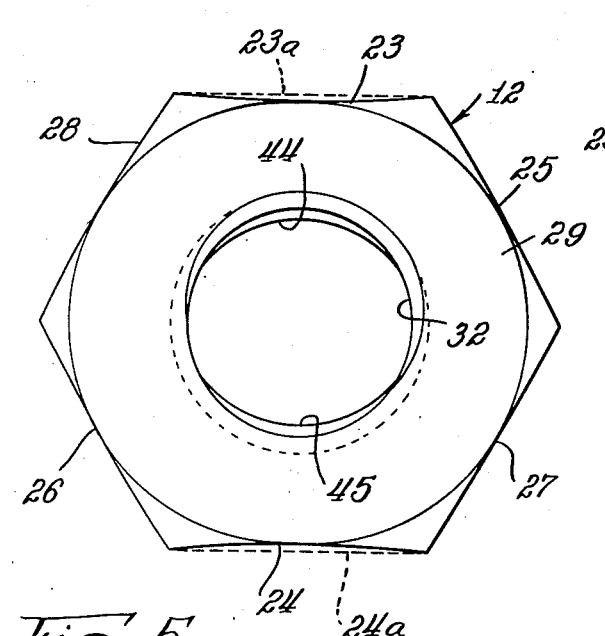
Figs. 5 and 6 are, respectively, end elevational and side sectional views similar to Figs. 2 and 3, but indicating the adaptation of my invention to a hexagonal nut.
Figure 6:
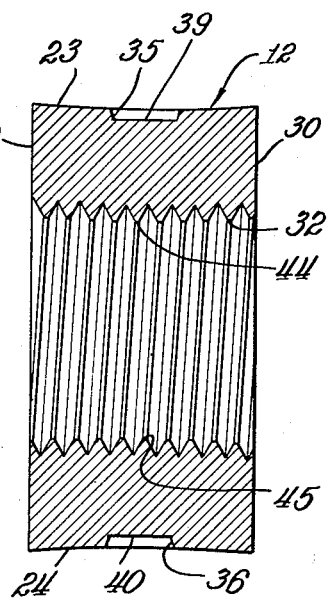

Having reference to the accompanying drawings, a square nut 10, shown in its various aspects in Figs. 1 to 3, inclusive, and a hexagonal nut 12, which is depicted in Figs. 5 and 6, are indicative and illustrative of the self-locking structure of my invention as applied to somewhat different types of nuts. Although Fig. 4 shows the application of the nut 10 to a threaded element, such as a bolt 13, the view would be substantially the same for illustrating the application of the nut 12 to a bolt of a predetermined proper size.

From a study of various known types of self-locking nut structures which are produced by the deformation of normally symmetrical unfinished nuts, it has been observed that the deformed locking thread portions have a structure such, and are so produced, that their self-locking action is destroyed or greatly diminished by their first application to a bolt of the proper size. Some such nut structures utilize deformations of an extent or character such that the starting of the application of the nut to a bolt is rendered difficult. Other self-locking nuts which embody localized deformations require the bolt threads actually to permanently reform and remove metal from the threaded portion of the nut because of the abruptness and extent of the deformation.

In my preferred self-locking nut structure as disclosed herein, which structure is readily subject to production by my preferred process, the locking action, although firm, is gradually and smoothly attained during the application of the nut to a bolt from either end of the nut, and is designed with a view to taking advantages of the elastic characteristics of the nut material so that even subject to reasonable wear, a nut may be used more than once on the same or different bolts of the same size without material loss or reduction of its self-locking action.

The unfinished nuts from which the self-locking nuts 10 and 12 are produced are, respectively, square and hexagonal in their normal form and are threaded in the usual manner with substantially circular threaded apertures. From such unfinished nuts of conventional form my self-locking nuts are produced by a particular manner and type of deformation, the extent of which is controlled to suit the size of the nut and the material of which it is made.

It may be observed as a preliminary consideration that if a metal object, such as a nut, is confined in one direction while being deformed in another, the confinement localizes the stresses and, consequently, the resultant flow of metal effected by the deforming force. Such localized deformation is conducive to abrupt rather than gradual changes of shape. Since I prefer smoothly curved and gradual deformations for producing the self-locking action, it is preferable that the nut body shall be substantially free to flex, except as confined by the deforming tools, and that the size and shape of the deforming tools shall be selected to effect the desired metal flow necessary for the production of smooth and gradual curvature along with localized effectiveness.

Referring more particularly to the square nut 10, which is shown in Figs. 1 to 3, inclusive, a nut body 14 has one pair of opposed side faces 15 and 16 disposed in substantially right angular relationship to a second pair of opposed side faces 17 and 18. A threaded aperture 19 extends through the nut body 14 midway between the opposed side faces 15, 16, 17 and 18, terminating at end faces 20 and 22 of the body. In the preliminary form of the blank from which the self-locking nuts of my invention are made, and as previously mentioned, the nut body is not only substantially symmetrical with respect to the axis of the aperture 19, but the opposed side faces 15, 16, 17 and 18 are substantially plane and the threaded aperture is substantially circular and of uniform dimensions throughout its length. The initial outer shape of the nut blank is indicated in Fig. 2 by the dotted lines 15a, 16a, 17a and 18a, it being understood that the amount of deformation shown is for illustrative purposes.

It may be similarly observed with respect to the hexagonal nut shown in Figs. 5 and 6 that it has pairs of diametrically opposed side faces 23 and 24, 25 and 26, and 27 and 28, as well as opposed end surfaces 29 and 30 and a threaded aperture 32 extending through the nut body from one end face to the other in substantially concentric relationship to the opposed pairs of side faces. In the threaded but undeformed nut, the opposed side faces are substantially plane as in the opposed side faces of the previously described nut; the initial position of the opposed sides 23 and 24 being illustratively depicted by the dotted lines 23a and 24a.

In my preferred self-locking nut structures, the initially symmetrical unfinished nuts are subjected to deformation which, in effect, produces a somewhat incidental axial and lateral concavity of opposed plane faces, such as 15 and 16 in the nuts of Figs. 1 to 3, and opposed faces 23 and 24 of the nut shown in Figs. 5 and 6. In some nuts, particularly those of the smaller sizes and those having side faces which are somewhat rough, the external deformation, which includes a concavity in one direction and a deformation by expansion in the transverse direction, is hardly noticeable to the eye. It is mentioned here as an indication of the nature of the nut body deformation.

For effecting the desired deformation of both types of nuts, I prefer to punch dimples into the mid-portions of two oppositely disposed side faces of the nut body while the surfaces surrounding the dimples and those separated from the dimples are free to assume their natural and unrestrained deformation which results from the normal and unimpaired flow of the nut body metal during the dimple-punching operation. In the square nut, shown in Figs. 1 to 3, inclusive, dimples 33 and 34 are punched into the mid-portions of the side faces 15 and 16, respectively. In the hexagonal nut of Figs. 5 and 6, dimples 35 and 36 are punched into the mid-portions of the opposed side faces 23 and 24, respectively.

By preference, the bottom surfaces 37, 38, 39 and 40 of the dimples 33, 34, 35 and 36, respectively, are substantially plane, while their side walls preferably taper outwardly to some extent. In addition to having substantially plane end surfaces, the dimples have an area of sufficient size and calculated to produce some general deformation of the nut body without causing any abrupt or localized deformations within the threaded aperture.

As a matter of fact, the external dimples 37, 38, 39 and 40 are an incident to the manner of attaining the desired and smoothly curved deformation of the threaded aperture. Factors including the material characteristics of the nut body, the force applied for effecting the deformation, as well as the size and sectional contour of the dimples, are determinative in the attainment of proper smoothly curved deformation of the threaded aperture, assuming, as previously mentioned, that the surfaces of the nut body apart from the dimpled areas at which the forces are applied are free for normal flexure and deformation.

As shown in Figs. 2, 3, 5 and 6, the threaded apertures 19 and 32 of the nuts 10 and 12, respectively, are deformed to an extent such that axial mid-portions 42 and 43 adjacent the dimpled side faces 15 and 16 of the nut 10 are smoothly bowed inwardly, while in a lateral direction the mid-portion of the aperture is somewhat expanded. Likewise, in the hexagonal nut 12, axial mid-portions 44 and 45, on opposite sides of the aperture 32, are smoothly bowed inwardly adjacent the dimpled side faces 23 and 24 of the nut. In both nuts, the ends of the apertures remain substantially round so that the threading onto bolts of proper sizes is readily accomplished regardless of which end of the nut is put on the bolt first. As depicted in Fig. 4, the described deformations of the nut apertures, in each instance, produces a very tight frictional engagement between the bolt threads and those of the axial mid-portion of the nut on the sides of the aperture which are bowed inwardly, and as indicated at 46. On laterally disposed sides of the aperture, the engagement between the bolt and nut threads is looser, as indicated at 47

Since both the axial and circumferential deformations of the threaded apertures embody smooth curves devoid of any abruptly deformed portions, it may be readily understood that the locking force effected by frictional engagement between the nut and bolt is gradually increased as the end of the bolt approaches the mid-portion of the nut and is maintained thereafter. By preference, and in addition to having the aperture deformations smoothly curved in lateral and circumferential directions, the amount of the deformation is preferably such that when the nut is threaded onto a bolt, the nut material is flexed in a return direction at the deformed portions by the application to the bolt, but such return flexure is insufficient to pass the elastic limit of the nut material. Thus, except for normal wear of the nut and bolt threads, the self-locking nuts herein disclosed and described may be repeatedly applied to and removed from bolts of the proper size without material loss of the locking properties of the nuts from one application to the next.

In Fig. 9, for the purpose of further indicating and emphasizing the type of deformation desired and utilized in my self-locking nuts, as well as the manner of the attainment of that deformation, a diagrammatical and simplified illustration is provided. The structure there shown for illustrative purposes may be considered to consist of four normally flat metal plates 48, 49, 50 and 52 disposed in rectangular relationship with the plates 48 and 50 resting upon the end margins of the plate 52 and supporting the end margins of the plate 49. Thus, the plates 48 and 50 are in opposed relationship as are the plates 49 and 52.

As indicated by oppositely disposed arrows 53 and 54, when the lower plate 52 is supported at its mid-portion by force applied thereto and a force is applied to the mid-portion of the top plate 49, those plates 49 and 52 will be flexed toward each other at their mid-portions, while the mid-portions of the side plates 48 and 50 will be flexed outwardly; the flexed positions of the plates 49 and 52 in one plane being indicated by dotted lines 49a and 52a, respectively, and the flexed positions of the plates 48 and 50 being indicated by dotted lines at 48a and 50a, respectively. In addition to the flexures in one plane depicted by the lines 49a and 52a, and particularly when the forces applied at the positions of the arrows 53 and 54 are sufficient to exceed the elastic limit of the plates 49 and 52, those plates will also be flexed in a transverse direction as indicated by the dotted lines at 49b and 52b. This illustrated and easily visualized flexure of plates serves as an analogy for indicating the types of flexure and deformation produced in the described self-locking nuts by my preferred method.

Figs. 7 and 8 are illustrative of a tool structure and method for consistently obtaining the desired deformation of self-locking nuts of the type disclosed and in accordance with my present invention. Fig. 8 shows the tool parts in their normal separated positions in which unfinished nuts are inserted for deformation; while Fig. 7 shows the positions of the parts during the deforming operation. In the disclosed tools, a stationary die block 55 has secured therein and projecting upwardly therefrom a centrally disposed punch 56. A support plate 57 has a central opening 58 therein through which a tapered end portion 59 of the punch 56 extends, and has secured therein and projecting from the lower face thereof a plurality of dowel pins 60 which fit slidably in aligned bores 62 in the die block. The upper ends of the bores 62 are counterbored to provide recesses 63 and shoulders 64. Compression springs 65 disposed around the dowel pins 60 in the recesses 63 and resting against the shoulder 64 resiliently support the plate 57 at a position normally spaced above the upper surface of the die block 55. By preference, the upper face of the support plate 57 is substantially flush with or somewhat above the end surface of the punch 56 when that support plate is in its normal position. Also, the distance between the support plate and die block is sufficient that the support plate does not materially interfere with the free flexure of the unfinished nut during the deforming operation.

At a position spaced above the die block 55, a movable punch block 66 carries a punch 67 in axially aligned relationship with the punch 56 and having an end portion 68 projecting therefrom toward the punch 56.

When the punch block and die block are separated, as shown in Fig. 8, an unfinished nut is placed therebetween and supported by the plate 57 with the punches 67 and 56 aligned with the mid-portions of opposite side faces of the unfinished nut. The unfinished nut normally rests upon the upper surface of the support plate 57 until the punch block is moved toward the die block to effect the deformation of the unfinished nut. In production, the unfinished nuts may be successively fed between the punch and die blocks from a chute.

Sufficient force is supplied to the punch block to effect the desired deformation of the unfinished nut, stressing the said nut beyond its elastic limit, and thereby producing the previously described distortion thereof. In this operation, the punch and die block parts assume substantially the positions indicated in Fig. 7 wherein the nut is supported on the end of the punch 56 so as simultaneously to apply opposed forces for deformation between the mid-portions of opposite side faces of the unfinished nut; the remaining surfaces and faces being free to flex in accordance with the normal flow of the nut metal. The support plate moves downwardly against the biasing forces of the springs 65 so as not to interfere materially with the normal flexure of the lower face of the nut. When hexagonal nuts are being deformed, guide blocks 69 and 70 may be utilized to locate the nut laterally with respect to the punch 56; it being feasible to use the locating blocks adjacent the side surfaces of such nuts since their locating surfaces are disposed in an angle such that the blocks and nut surfaces separate when the support plate moves downwardly during the deformation of the nut.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A self-locking nut comprising a polygonal body having pairs of opposite side walls and opposite end walls and said body being provided with a threaded bolt-receiving aperture extending therethrough from one end wall to the other and whose axis is centrally disposed relative to the meeting lines of said side walls, the side walls of one pair thereof being concaved inwardly both parallel to and transversely of said axis, the side walls of another pair thereof being convexed outwardly both parallel to and transversely of said axis, said threaded bolt-receiving aperture being circular and of equal diameter at opposite ends thereof and convexed inwardly from points adjacent said opposite ends in an axial plane normal to said first pair of walls, and the thickness of the nut body surrounding said aperture in said plane being less than that in an axial plane normal to the walls of said other pair thereof.

2. A method of forming a self-locking nut from a standard nut including a polygonal body having pairs of opposite side walls, opposite end walls, and a threaded bolt-receiving aperture of uniform diameter extending through said body from one end wall to the other and in symmetrical relation to said side walls; comprising the following steps, yieldably supporting said nut from one side wall thereof, and then simultaneously indenting diametrically opposed relatively small substantially centrally located surface areas of said supported and the opposite side wall under radially inwardly directed pressures thereon during yieldably resisted bodily movement of the nut in the direction of said yieldably supported side wall thereof with a resulting concavity of said indented side walls and a corresponding convexity of opposed walls of another pair thereof on said polygonal body and said aperture being reduced in diameter intermediate its ends in an axial plane of said indented side walls.

References Cited in the file of this patent

UNITED STATES PATENTS

| Number | Name | Date |
|---|---|---|
| 675,740 | Keen | June 4, 1901 |
| 1,263,061 | Hibbard | Apr. 16, 1918 |
| 1,903,921 | Rupf | Apr. 18, 1933 |
| 1,903,922 | Rupf | Apr. 18, 1933 |
| 2,125,276 | Green | Aug. 2, 1938 |
| 2,286,982 | Todd | June 16, 1942 |
| 2,445,696 | Rudd | July 20, 1948 |

FOREIGN PATENTS

| Number | Country | Date |
|---|---|---|
| 1,003 | Great Britain | Mar. 8, 1880 |
| 10,396 | Great Briain | Aug. 13, 1886 |
| 607,984 | France | July 12, 1926 |